(12) United States Patent
Dobler

(10) Patent No.: US 7,164,675 B2
(45) Date of Patent: Jan. 16, 2007

(54) TELEPHONY DATA TO HOST STREAMING VIA A COMPUTER INTERFACE

(75) Inventor: Steven R Dobler, Stanhope, NJ (US)

(73) Assignee: Intel Corporation, Santa Clara, CA (US)

( * ) Notice: Subject to any disclaimer, the term of this patent is extended or adjusted under 35 U.S.C. 154(b) by 962 days.

(21) Appl. No.: 10/107,385

(22) Filed: Mar. 27, 2002

(65) Prior Publication Data

US 2003/0185231 A1 Oct. 2, 2003

(51) Int. Cl.
*H04L 12/66* (2006.01)

(52) U.S. Cl. ...................................... 370/352; 370/535

(58) Field of Classification Search ................ 370/465, 370/451, 352, 535, 537, 342, 442, 353–356; 710/305

See application file for complete search history.

(56) References Cited

U.S. PATENT DOCUMENTS

2002/0129186 A1* 9/2002 Emerson et al. ............ 710/302

2002/0131604 A1* 9/2002 Amine ........................ 381/58

* cited by examiner

*Primary Examiner*—Ajit Patel
(74) *Attorney, Agent, or Firm*—Grossman, Tucker, Perreault & Pfleger, PLLC

(57) ABSTRACT

Bi-directional streaming of telephony data such as Pulse Code Modulation ("PCM") and Time Division Multiplexing ("TDM") data to a host processor via a standard personal computer interface is disclosed. PCM/TDM data is moved via a hard disk drive Intelligent Drive Electronics ("IDE") interface, a hard disk drive Small Computer System Interface ("SCSI") interface, a Dual In-line Memory Module ("DIMM") interface, or a Single In-line Memory Module ("SIMM") interface. A small board is installed on the computer motherboard that has an SCbus/CTbus/MVIP bus connector, an SCbus/CTbus/MVIP bus switching ASIC, a control processor, memory, and associated logic, and at least one of an IDE, SCSI, DIMM, or SIMM interface. The control processor receives the PCM/TDM data from the bus, formats it to resemble a memory device, and then initiates a direct memory access ("DMA") to transfer the PCM/TDM information to the host processor.

24 Claims, 2 Drawing Sheets

TELEPHONY DATA TO HOST STREAMING VIA A COMPUTER INTERFACE

BACKGROUND

1. Field of the Invention

Embodiments described herein are directed to bi-directional streaming of telephony data to a host processor via a standard personal computer interface. Specifically, Pulse Code Modulation ("PCM") and Time Division Multiplexing ("TDM") data is moved via a hard disk drive Intelligent Drive Electronics ("IDE") interface, a hard disk drive Small Computer System Interface ("SCSI"), a Dual In-line Memory Module ("DIMM") interface, or a Single In-line Memory Module ("SIMM") interface.

2. Related Art

A typical computer telephony system includes a personal computer ("PC") and at least one Industry Standard Architecture ("ISA"), Peripheral Component Interconnect ("PCI"), and Compact Peripheral Component Interconnect ("cPCI") plug-in telephony boards. Such telephony boards include multiple telephone network or phone station interfaces, at least one control processor and associated circuitry, at least one digital signal processor ("DSP") and associated circuitry for processing voice and tone information, ISA, PCI, and cPCI bus interfaces, and an SCbus, Computer Telephony ("CT") bus, or Multi-Vendor Integration Protocol ("MVIP") bus interface to allow sharing of voice data across multiple telephony boards. The SCbus, CTbus and MVIP bus are standardized interfaces in the telephony industry.

As the processing power of host processors continues to increase, there are many leftover million instructions per second ("MIPS") that are not being used. Making use of the extra MIPS to perform some or all of the functionality of the telephony board's DSPs, thereby eliminating these parts and reducing the cost of the product has become a recent trend.

In current PCs, there are a limited number of slots because most of the circuitry that was once on plug-in boards such as video, sound board, disk drive interfaces, and modems are now integrated into a PC's motherboard. Hence, the number of computer telephony boards that can be placed into a PC is limited by the number of expansion slots that the PC contains.

In order to send the Pulse Code Modulation ("PCM") and Time Division Multiplexing ("TDM") voice information from the telephony board to the host processor, a low-latency, high-bandwidth channel is needed. Currently, a special application-specific integrated circuit ("ASIC") has been designed to reside on a new telephony board. This ASIC can move PCM/TDM data from the telephony board through the ISA, PCI, or cPCI interface to the host to processor.

While this ASIC solves the problem of delivering the PCMI TDM data streamed to the host processor for newly designed boards, it does not provide a solution for older products or for systems that have all of their expansion slots already filled. A method of moving PCM/TDM data to the host processor on a vehicle other than the ISA, PCI, or cPCI bus interface is thus necessary. Streaming PCM/TDM data via a standard PC interface such as a hard disk drive Intelligent Drive Electronics ("IDE") interface, a hard disk drive Small Computer System Interface ("SCSI"), a Dual In-line Memory Module ("DNIM") interface, or a Single In-line Memory Module ("SIMM") interface will prove beneficial.

That is, a small board that takes PCM/TDM data from the computer telephony board via the SCbus/CTbus/MVIP bus interface and then streams it to the host processor via one of the aforementioned interfaces is advantageous. The board is designed to look like a disk or memory device and have the capability to inform the host processor to initiate, for example, a direct memory access ("DMA") transfer of the data. Other types of data transfers may similarly be used, such as when data transfer is controlled by the PC's host processor.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

The following paragraphs describe telephony data, such as by way of example, Pulse Code Modulation ("PCM") and Time Division Multiplexing ("TDM") data, to host streaming via a standard personal computer ("PC") interface such as a hard disk drive Intelligent Drive Electronics ("IDE") interface, a hard disk drive Small Computer System Interface ("SCSI"), a Dual In-line Memory Module ("DIMM") interface, or a Single In-line Memory Module ("SIMM") interface.

PCM is a sampling technique for digitizing analog signals, especially audio signals. For example, music CDs are produced by capturing continuous live sound at frequent intervals and then digitizing each sample. PCM samples signals 8,000 times a second, whereby each sample is represented by 8 bits for a total of 64-kbps. PCM is generally used with T-1 and T-3 carrier systems. These carrier systems combine PCM signals from many lines and transmit them over a single cable or other medium. PCM may similarly be used with the E-1 carrier system, which is the European standard for digital telephony data. An E-1 connection handles thirty simultaneous conversations.

TDM is a type of multiplexing that combines data streams by assigning each stream a different time slot in a set. That is, with TDM each signal is assigned a fixed time slot in a fixed rotation. TDM then repeatedly transmits a fixed sequence of time slots over a single transmission channel. Within T-carrier systems, such as T-1 and T-3, TDM combines PCM streams created for each conversation or data stream. A T-1 connection handles twenty-four simultaneous conversations.

An IDE interface is an interface for mass storage devices, in which the controller is integrated into the disk or CD-ROM drive. A SCSI is a parallel interface standard for attaching peripheral devices to computers such as disk drives and printers. SCSIs provide for faster data transmission rates than standard serial and parallel ports. In addition, many devices may be attached to a single SCSI port, such that SCSI is really an input-output ("I/O") bus rather than simply an interface. A DIMM interface is a small circuit board that holds memory chips. A DIMM has a 64-bit path to the memory chips. In contrast, a SIMM interface provides a 32-bit path to memory.

Figure 1:
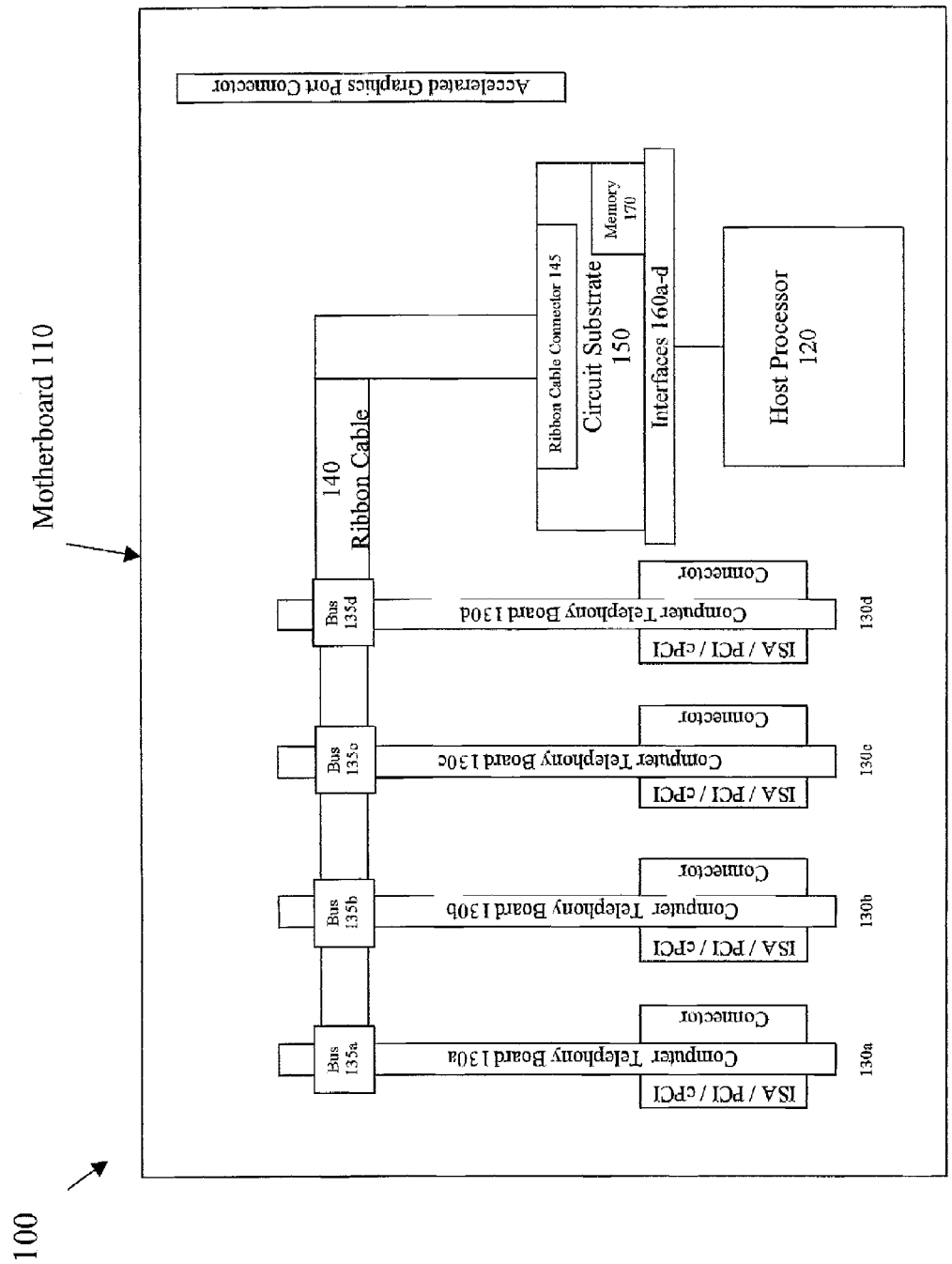
FIG. 1 is a block diagram of a computer telephony system that is built into a personal computer, according to an embodiment of the present invention.

FIG. 1 shows a computer telephony system 100 that is built into a PC. One or more computer telephony boards 130a–d plug into available Industry Standard Architecture ("ISA"), Peripheral Component Interconnect ("PCI"), and Compact Peripheral Component Interconnect ("cPCI") slots. Each computer telephony board 130a–d has an SCbus, a Computer Telephony ("CT") bus, or an MVIP bus 135a–d on it. The computer telephony boards 130a–d and the SCbuses, CTbuses, and MVIP buses 135a–d are connected via a ribbon cable 140. A CTbus, for example, is designed to transport and switch 64-kbps low-latency communication traffic. CTbuses provide 32 data streams at 8.192 Mb/s, over 260 Mb/s bandwidth, redundant data and frame clocks, redundant reference clocks, and up to twenty-one slots. This arrangement allows each computer telephony board 130a–d access to any PCM/TDM time slot within the computer telephony system 100 by switching it from the ribbon cable 140. That is, an SCbus/CTbus/MVIIP bus Application Specific Integrated Circuit ("ASIC") 200 (as shown in FIG. 2) connects to the ribbon cable 140 and provides the switching matrix that is present on computer telephony boards 130a–d.

A circuit substrate layer 150 such as a printed circuit board has access to these time slots via a ribbon cable connector or a circuit edge board connector 145 and streams them to the PC's host processor 120 via a suitable computer interface such as for example an IDE, SCSI, DIMM, or SIMM interface 160a–d on the motherboard 110. Separate assemblies for each interface 160a–d are used. Memory 170 is further used for the temporary storage of real-time PCM/TDM data until the host processor 120 is ready for the data transfer. The streaming of the PCM/TDM data is bi-directional. That is, data from the SCbus/CTbus/MVIP bus can be sent to the host processor 120, and the host processor 120 can also send PCM/TDM data to the telephony buses.

Figure 2:
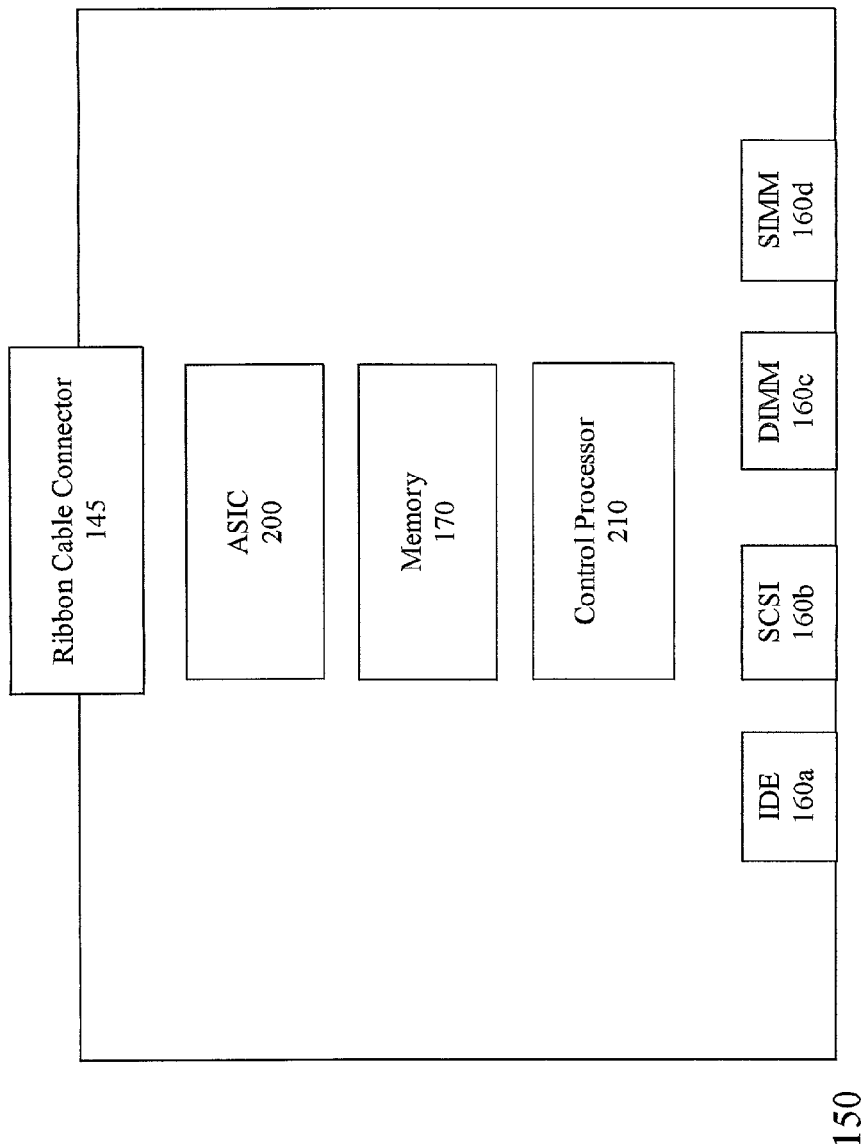
FIG. 2 is a block diagram of a board having an IDE, SCSI, DIMM, or SIMM interface, for streaming telephony data from an SCbus, CTbus, or MVIP bus, according to an embodiment of the present invention.

As shown in FIG. 2, the circuit substrate layer 150 has an SCbus/CTbus/MVIP bus ribbon cable connector or circuit board edge connector 145, an SCbus/CTbus switching ASIC 200, a control processor and associated logic 210, memory 170, and one of an IDE, SCSI, DIMM, or SIMM interface 160a–d. The control processor 210 takes the PCM/TDM data from the SCbus/CTbus/MVIP bus 135a–d and formats it to look like a memory device and then initiates, for example, a Direct Memory Access ("DMA") to move the PCM/TDM information to the host processor 120. DMA is a technique for transferring data from main memory to a device without passing the data through the central processing unit ("CPU"). Other types of data transfers may be used. Such a circuit substrate layer 150 may be used on all existing and future telephony systems, wanting to leverage host-based signal processing, that either lack sophisticated technology or have no available slots.

While the above description refers to particular embodiments of the present invention, it will be understood to those of ordinary skill in the art that modifications may be made without departing from the spirit thereof The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. An apparatus to stream telephony data comprising:
   a computer telephony bus connector adapted for coupling to at least one computer telephony bus associated with a computer telephony board, and for receiving streamed telephony data from the computer telephony board;
   a computer interface for plugging into a standard personal computer interface connector and adapted for coupling to a host processor for streaming telephony data from the apparatus to the host processor;
   a bus switching application specific integrated circuit electrically coupled to the computer telephony bus connector to provide a switching matrix for the computer telephony bus to gain access to telephony data;
   a control processor and associated logic for processing the streamed telephony data and directing same to the computer interface; and
   a memory for temporarily storing streamed telephony data.

2. The apparatus of claim 1, wherein the telephony data is at least one of pulse code modulation data and time division multiplexing data.

3. The apparatus of claim 2, wherein the control processor formats the telephony data to resemble a memory device.

4. The apparatus of claim 3, wherein the control processor initiates a data transfer request to the host processor to transfer the telephony data, and the host processor responds with a data transfer grant when it is ready.

5. The apparatus of claim 1, wherein the computer interface is at least one of an Intelligent Drive Electronics interface, a hard disk drive Small Computer System Interface, a Dual In-line Memory Module interface, and a Single In-line Memory Module.

6. A computer telephony system to stream telephony data, comprising:
   a motherboard;
   a host processor coupled to the motherboard;
   at least one computer telephony board, located on the motherboard, having at least one computer telephony bus, joined via a connector;
   a circuit substrate layer, located on the motherboard, having access to telephony data time slots and having a computer telephony bus connector, a computer telephony bus switching application specific integrated circuit, a control processor, memory, and associated logic, and at least one computer interface.

7. The computer telephony system of claim 6, wherein the telephony data is at least one of pulse code modulation data and time division multiplexing data.

8. The computer telephony system of claim 6, wherein the control processor receives the telephony data from the computer telephony bus connector.

9. The computer telephony system of claim 8, wherein the control processor formats the telephony data to resemble a memory device.

10. The computer telephony system of claim 9, wherein the control processor initiates a data transfer request to the host processor to transfer the telephony data, and the host processor responds with a data transfer grant when it is ready.

11. The computer telephony system of claim 6, wherein the computer telephony bus switching application specific integrated circuit connects to the computer telephony bus connector and provides a switching matrix for the computer telephony bus to gain access to telephony data.

12. The computer telephony system of claim 6, wherein the computer interface is at least one of an Intelligent Drive Electronics interface, a hard disk drive Small Computer System Interface, a Dual In-line Memory Module interface, and a Single In-line Memory Module interface.

13. The computer telephony system of claim 12, wherein the at least one the Intelligent Drive Electronics interface, the hard disk drive Small Computer System Interface, the Dual In-line Memory Module interface, and the Single In-line Memory Module interface stream the telephony data to the host processor.

14. A method of streaming telephony data, comprising:
receive telephony data via a computer telephony bus;
employing a control processor on a circuit substrate layer to take the telephony data from the computer telephony bus and format it to resemble a memory device;
initiating a data transfer of the telephony data to a host processor;
using the circuit substrate layer to stream the telephony data to the host processor via a computer interface.

15. The method of claim 14, wherein the telephony data is at least one of pulse code modulation data and time division multiplexing data.

16. The method of claim 14, wherein the computer interface is at least one of an Intelligent Drive Electronics interface, a hard disk drive Small Computer System Interface, a Dual In-line Memory Module interface, and a Single In-line Memory Module interface.

17. The method of claim 16, wherein the circuit substrate layer contains separate assemblies for each of the Intelligent Drive Electronics interface, the hard disk drive Small Computer System Interface, the Dual In-line Memory Module interface, and the Single In-line Memory Module interface.

18. The method of claim 14, wherein a direct memory access is initiated to conduct the data transfer.

19. A system to stream telephony data to a host processor comprising a computer readable medium and a computer readable program code stored on the computer readable medium and executable by a computer, said computer readable program code having instructions to:
receive telephony data via a computer telephony bus;
format the telephony data to resemble a memory device by employing a control processor on a circuit substrate layer to take the telephony data from the computer telephony bus;
initiate a data transfer of the telephony data to a host processor;
stream the telephony data to the host processor via a computer interface by using the circuit substrate layer.

20. The system of claim 19, wherein the telephony data is at least one of pulse code modulation data and time division multiplexing data.

21. The system of claim 19, wherein instructions are provided to a control processor to format the telephony data.

22. The system of claim 19, wherein instructions are provided to a circuit substrate layer to stream the telephony data to the host processor.

23. The system of claim 19, wherein the computer interface is one of an Intelligent Drive Electronics interface, a hard disk drive Small Computer System Interface, a Dual In-line Memory Module interface, and a Single In-line Memory Module interface.

24. The system of claim 19, wherein a direct memory access is initiated to transfer the telephony data.

* * * * *